Patented Mar. 1, 1932

1,847,367

UNITED STATES PATENT OFFICE

JAMES L. STEVENS, OF HAYDEN, ARIZONA, ASSIGNOR TO RACONITE CHEMICAL COMPANY, A CORPORATION OF ARIZONA

CONCENTRATION OF ORES, MINERALS, AND THE LIKE

No Drawing.    Application filed April 8, 1929.  Serial No. 353,698.

This invention relates to the concentration of ores, minerals and the like by flotation processes and particularly by the froth flotation processes, and the principal objects of the invention are the provision of certain improvements in such processes and in particular the improvement of such processes by utilization of reagents of a certain class, and having certain properties, as mineral collecting agents therein.

I have found that advantageous results may be obtained in the froth flotation processes by adding to the ore pulp a mineral collecting agent consisting of an organic sulphur-bearing product formed by reaction between a xanthate and sulphur di-chloride. Mineral collecting agents of this new type may be considered as having a general formula of $(R-OCS_2)_2S$ in which R is the organic radical of the xanthate from which the agent is prepared and is in general any organic radical capable of forming a xanthate, such as an alkyl radical or other suitable hydrocarbon or organic radical.

While the above general formula $(R-OCS_2)_2S$ is given as representing the constituents of the compounds of the class used as mineral collecting agents according to this invention, it is to be understood that I do not wish to be restricted to any particular structural formula or arrangement of the atoms or radicals in the molecule in these reagents, as I am unable to state positively at the present time the exact structural arrangement thereof. However, the following example is submitted to give my present conception of a probable structural formula for these compounds.

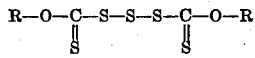

Various products having the above probable formula and suitable for use as mineral collecting agents in froth flotation processes have been prepared by treating various alkali metal xanthates with sulphur di-chloride. For example, the ethyl product, having the probable formula $(C_2H_5OCS_2)_2S$, was prepared by slowly adding sulphur di-chloride $(SCl_2)$ to an agitated aqueous solution of potassium ethyl xanthate $(C_2H_5OCS_2K)$. This product precipitated from the aqueous solution in the form of a heavy oil, having a specific gravity of approximately 1.335 at a temperature of 18° C., and was collected and separated from the aqueous layer after completion of the reaction. The probable reaction in this case may be indicated by the following equation:

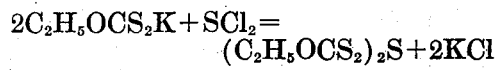

In using quantities of the ingredients in substantially the theoretical amounts, the above reaction will go substantially to completion. By reason of the formation of these compounds from xanthates in this manner, I believe that they consist in general of two xanthyl radicals linked to a single sulphur atom, and that they have the above mentioned general formula. They may therefore be classified under the general name of di-xanthyl sulphides.

In making one particular batch of the above mentioned ethyl product, in the laboratory, crystalline potassium ethyl xanthate was dissolved with water and filtered to remove undissolved residue. A measured amount of this aqueous solution containing approximately 320 grams of the xanthate was diluted with water to a volume of one liter and placed in a wide mouth bottle equipped with a mechanical agitator. The xanthate solution was agitated and sulphur di-chloride (approximately 103 grams) slowly added until the xanthate was completely exhausted, which was determined by testing the aqueous solution with copper sulphate. The contents of the flask were then allowed to stand and separate by gravity, and the desired oily product was separated by drawing off from beneath the aqueous layer by means of a separatory funnel. The quantity of the oily product recovered from this batch amounted to about 92% of the theoretical yield, based on the assumed quantity of the crude xanthate employed. The xanthate employed in this test was a commercial grade and it appears that a higher yield of the reaction product could be obtained by employing a pure xanthate.

The reaction between an alkali metal xanthate and sulphur di-chloride is exothermic and the two substances in concentrated form generally react violently, producing excessive heat. Therefore, means for preventing excessive rise in temperature while the reaction is taking place may advantageously be employed, any suitable cooling means being provided for this purpose. In the above batch the reaction vessel containing the xanthate solution was kept cool by surrounding same with ice water.

It is also advantageous to disperse or dissolve the xanthate in a liquid medium in order to retard the reaction and assist in keeping the temperature within the desired limits, and water has been found to be a satisfactory liquid for this purpose. The temperature of the reaction may be further controlled by the rate at which the sulphur di-chloride is added.

I prefer to carry out the reaction, when employing alkali metal xanthate and sulphur di-chloride, at a sufficiently low temperature to prevent an excessive decomposition of the sulphur di-chloride, other than by its reaction with the xanthate. In the above example of the ethyl compound the temperature was held below 20° C., until the major portion of the sulphur di-chloride had been added, and at the end of the reaction was permitted to rise to approximately 38° C. If the temperature is allowed to rise, during the reaction, sufficiently to cause a considerable decomposition of the sulphur di-chloride into sulphur mono-chloride and chlorine, other reaction products may be formed in minor quantities, by reaction of either or both of these decomposition products with the xanthate.

Any suitable sequence of adding the various ingredients may be employed; however, I prefer to add the sulphur di-chloride to an aqueous solution of xanthate. The alkali-metal chloride formed by the reaction may be removed in solution with the water after the reaction is completed.

For preparing the products of the present invention from various other xanthates, the same procedure as described for the ethyl product may be employed. For example, the normal butyl product was prepared by adding sulphur di-chloride to an agitated aqueous solution of normal butyl sodium xanthate. The amounts of sulphur di-chloride and xanthate were employed in approximately molecular relation, i. e., using approximately one molecular equivalent of sulphur di-chloride to two molecular equivalents of the xanthate.

The crude product resulting from only reasonably pure materials, in the specific examples above described, is quite fluid at ordinary temperatures, yellow to dark amber in color, soluble or miscible with many organic solvents including pine oil, gasoline, amyl chloride, etc., and substantially insoluble in water, although water appears to be capable of dissolving small amounts.

While the crude products formed at temperatures at which I prefer to carry out the reaction are truly oily liquids, nevertheless at lower temperatures it is entirely possible that the compounds may form as solids.

In general the oil product, as extracted from the aqueous solution after the reaction is complete, has a turbid appearance which appears to be due to a small amount of entrapped moisture. The oil may be clarified by allowing same to stand and then filtering through a dry filter. Usually the amount of residue remaining on the filter is negligible.

The compounds of the present invention appear also to be formed as decomposition products of the compounds formed by reaction between various xanthates and di-sulfur mono-di-chloride. The compounds formed by reaction between di-sulfur di-chloride and xanthates are described in my application for patent on "Concentration of ores, minerals and the like", filed January 15, 1929, Serial No. 332,741, and are believed to have a general formula of $(R-OCS_3)_2$, in which R is an alkyl or other organic radical. Some of these compounds are unstable when heated and tend to decompose rapidly as the temperature approaches their boiling points. This decomposition results in freeing sulfur which precipitates on cooling. For example, the ethyl compound formed by reaction between potassium ethyl xanthate and di-sulfur di-chloride and having a formula of $(C_2H_5OCS_3)_2$ or $C_6H_{10}O_2S_6$, was heated to approximately 170° C. Upon cooling, free sulphur started to precipitate. After standing in a cool place for about 48 hours sufficient sulphur precipitated to reduce the specific gravity from about 1.41 to 1.35 at 18° C. The sulphur was removed and the resultant oily liquid apeared to contain a very large amount of the ethyl compound of the present invention. This decomposition may be indicated by the following equation:

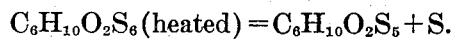

$$C_6H_{10}O_2S_6 \text{(heated)} = C_6H_{10}O_2S_5 + S.$$

By applying excessive heat to the oil, further decomposition takes place, resulting in the formation of various compounds of a complex nature.

Another possible method of forming the compounds of this invention is shown by the following example: One particular batch of the product formed by reaction between ethyl xanthate and di-sulfur di-chloride was agitated and washed with a warm saturated aqueous solution of caustic soda. This treatment appeared to remove a small amount of materials from the original oily product, resulting in clarifying the oil. The specific gravity of the original oil, immediately after washing, was substantially the same as before washing. However, after standing several days, sufficient crystalline sulphur has precipitated to reduce the specific gravity of the oil from about 1.41 to 1.35 at 18° C. The resultant oily product also appeared to contain a very large amount of the ethyl compound of the present invention.

This application for patent is directed to the method of concentration of ores, minerals and the like with the use of mineral collecting agents of the type above described. The composition of such reagents, and the methods of making the same, as above described, are covered in a separate application for patent executed by me of even date herewith, but the above description of these products and the method of making the same is given above in order to clearly define this novel class of agents and show how the same may be readily prepared.

In applying the above described reagents to the concentration of ores, minerals and the like by flotation processes, they may be introduced into the ore pulp in any suitable way and may be used in conjunction with any other suitable reagent or reagents which may also be employed to promote flotation; for instance, they may be introduced into the tube mill in which the ore is being ground or may be added to the ore pulp just before it enters the flotation cell, and may if desired be added in admixture with other reagents such as pine oil, in which they are in general readily soluble. However, in general, I prefer to subject these reagents to agitation with the ore pulp prior to entering the flotation cell and in some cases to apply them in admixture with solvents thereof to aid in dispersion throughout the ore pulp.

In general, these reagents come in the class of flotation reagents known to the art as "mineral collecting agents", and, in general, it is necessary to employ a suitable frothing agent in conjunction therewith in carrying out the froth flotation process. Of these various reagents I have found the reagent comprising the ethyl compound to be particularly effective as a mineral collecting agent, and when employed in conjunction with a suitable frothing agent, such as pine oil, in carrying out the froth flotation process, its collecting action appears to be unusually fast. It thus reduces, in some cases, the usual amount of time required to effect the desired recoveries.

The reagents of the present invention exhibit marked ability to cause only certain valuable minerals to be concentrated from an ore pulp containing objectionable minerals which ordinarily also tend to concentrate. For example, in ores containing a plurality of floatable minerals such as copper minerals and pyrite, these reagents exhibit a marked selective action on the copper minerals but show very little tendency to float pyrite under ordinary conditions. The pyrite may be caused to float, if desired, however, by increasing the amount of the reagent or by employing a suitable reagent in conjunction therewith to promote the flotation of the pyrite.

Due to the chemical nature of these reagents they are not easily destroyed by acids or soluble salts that frequently occur in ore pulps, and therefore may be applied to the treatment of certain ores which are refractory to certain other reagents.

The reagents of the present invention may be employed in alkaline, neutral or acid ore pulps. However, in general, I prefer to employ these reagents in an alkaline ore pulp, particularly when it is desirable to selectively separate one class of floatable mineral from another. The use of lime has been found very satisfactory for making the ore pulp alkaline. However, other suitable alkalis, such as caustic soda, soda ash, trona, or the like, may be employed.

The following table shows results obtained by applying certain of the compounds of the present invention, in varying proportions, as flotation mineral collecting agents, to the concentration of ore from the Ray mines of the Nevada Consolidated Copper Company:

*Table of metallurgical results*

| Test No. | Collecting agent | | Heads | | Tailings | | Concentrates | | |
|---|---|---|---|---|---|---|---|---|---|
| | Compound | Lbs./ton ore | % Cu | % Fe | % Cu | % Fe | % Cu | % Fe | % Ins. |
| 1 | Ethyl compound | .10 | 1.06 | 3.54 | .12 | .89 | 12.1 | 30.8 | 15.5 |
| 2 | Ethyl compound | .05 | 1.06 | 3.54 | .13 | .95 | 11.7 | 31.5 | 14.4 |
| 3 | Ethyl compound | .02 | 1.06 | 3.54 | .13 | 2.26 | 18.3 | 27.8 | 16.4 |
| 4 | Butyl compound | .05 | 1.06 | 3.54 | .13 | 2.10 | 18.6 | 26.3 | 18.4 |

For the above tests the ore was prepared for flotation by crushing to minus 8 mesh, classifying the crushed ore by washing out the slimes with water, and grinding the sands to a suitable fineness in a laboratory pebble mill. A total of five pounds of crude lime per ton of ore was used; one pound being added to the original ore prior to classifying, three pounds added to the sands prior to grinding in pebble mill and one pound to the primary slimes after thickening. After grinding the sands, the ground sands and thickened primary slimes were mixed and the collecting agent and pine oil (approximately 0.2 lb. pine oil per ton solids) added. The pulp was then placed in the flotation machine and subjected to two minutes pre-agitation to facilitate dispersion of the reagent. The pulp was then agitated to produce a mineral bearing froth and the mineral was removed by allowing same to overflow the cell with the froth. In test #3 the collecting agent was added in admixture with part of the total pine oil employed; the remainder of the pine oil being subsequently added to bring the total amount up to 0.2 lbs. per ton solids.

I claim:

1. The method of concentration of minerals by flotation which comprises adding to a mineral pulp a reagent of the type formed by the reaction of sulphur di-chloride with an alkali-metal xanthate, and then subjecting the pulp to a froth-flotation operation in the presence of such reagent.

2. The method of concentration of minerals by flotation which comprises adding to a mineral pulp a reagent comprising an organic reaction product formed by adding sulphur di-chloride to an aqueous solution of an alkali-metal xanthate, and then subjecting the pulp to a froth-flotation operation in the presence of such reagent.

3. The method of concentration of minerals by flotation which comprises adding to a mineral pulp a reagent comprising an organic sulphur-bearing product formed by reaction of sulphur di-chloride with an alkali-metal alkyl xanthate, and then subjecting the pulp to a froth-flotation operation in the presence of such reagent.

4. The method of concentration of minerals by flotation which comprises adding to a mineral pulp, a reagent comprising an oily organic liquid difficultly soluble in water and formed by adding sulphur di-chloride to an aqueous solution of an alkali-metal alkyl xanthate, and then subjecting the pulp to a froth-flotation operation in the presence of such reagent.

5. The method of concentration of minerals by flotation which comprises adding to a mineral pulp a reagent comprising the product of reaction of sulphur di-chloride with an aqueous solution of an alkali-metal ethyl xanthate, and then subjecting the pulp to a froth-flotation operation in the presence of such reagent.

6. The method of concentration of minerals by flotation which comprises adding to a mineral pulp a reagent comprising an organic sulphur-bearing product formed by reaction of sulphur di-chloride with an alkali-metal xanthate at a temperature sufficiently low to substantially prevent decomposition of the sulphur di-chloride other than by its reaction with the xanthate, and then subjecting the pulp to a froth-flotation operation in the presence of such reagent.

7. The method of concentration of minerals by flotation which comprises adding to a mineral pulp a reagent comprising an organic sulfur-bearing product of the type formed by reaction between one molecular proportion of sulfur di-chloride and two molecular proportions of an alkali-metal xanthate, and then subjecting the pulp to a froth flotation operation in the presence of such reagent.

8. The method of concentration of minerals by flotation which comprises adding to a mineral pulp a reagent comprising an organic sulfur-bearing product of the type formed by reaction between one molecular proportion of sulfur di-chloride and an aqueous solution containing two molecular proportions of an alkali-metal alkyl xanthate, and then subjecting the pulp to a froth flotation operation in the presence of such reagent.

In testimony whereof I have hereunto subscribed by name this 4th day of April, 1929.

JAMES L. STEVENS.